United States Patent
Ozaki (10) Patent No.: US 9,253,190 B2
(45) Date of Patent: Feb. 2, 2016

(54) INFORMATION MANAGEMENT SYSTEM AND METHOD FOR MANAGING IDENTIFICATION INFORMATION

(75) Inventor: Yoshitaka Ozaki, Okazaki (JP)

(73) Assignee: DENSO CORPORATION, Kariya (JP)

(*) Notice: Subject to any disclaimer, the term of this patent is extended or adjusted under 35 U.S.C. 154(b) by 262 days.

(21) Appl. No.: 13/533,226

(22) Filed: Jun. 26, 2012

(65) Prior Publication Data

US 2013/0005302 A1 Jan. 3, 2013

(30) Foreign Application Priority Data

Jun. 28, 2011 (JP) ................................ 2011-142834

(51) Int. Cl.
*H04M 1/66* (2006.01)
*H04L 29/06* (2006.01)
*H04L 29/08* (2006.01)

(52) U.S. Cl.
CPC ........... *H04L 63/0876* (2013.01); *H04L 63/062* (2013.01); *H04L 63/104* (2013.01); *H04L 67/12* (2013.01)

(58) Field of Classification Search
CPC ..... H04W 12/06; H04W 12/04; H04W 12/08; H04W 12/10; H04W 12/12; H04L 67/12; H04L 2209/84; H04L 63/08; H04L 63/0823; H04L 63/0853; H04L 63/0869; H04L 63/061; H04L 63/0876; B60R 2325/01; B60R 2325/202; B60R 2325/205
USPC ........ 455/410, 411, 414.1, 418–420; 340/5.1, 340/5.33, 5.6, 5.81, 5.85, 12.22–12.29; 380/278–285, 44
See application file for complete search history.

(56) References Cited

U.S. PATENT DOCUMENTS

| | | | |
|---|---|---|---|
| 6,824,048 B1 | 11/2004 | Itabashi et al. | |
| 2005/0107132 A1* | 5/2005 | Kamdar et al. | 455/569.2 |
| 2005/0179518 A1* | 8/2005 | Kawamura et al. | 340/5.23 |
| 2006/0019720 A1 | 1/2006 | Kakehi | |
| 2006/0111046 A1* | 5/2006 | Sugimoto et al. | 455/41.2 |

(Continued)

FOREIGN PATENT DOCUMENTS

| | | |
|---|---|---|
| JP | 2004-248042 | 9/2004 |
| JP | 2008-085423 | 4/2008 |
| JP | 2009-278265 | 11/2009 |

OTHER PUBLICATIONS

Office Action issued in the corresponding CN application No. 201210220241.8 dated Nov. 14, 2014 with English translation.

*Primary Examiner* — Allahyar Kasraian
(74) *Attorney, Agent, or Firm* — Harness, Dickey & Pierce, P.L.C.

(57) ABSTRACT

A registration unit associates identification information of a portable terminal device with identification information of a vehicle, which is to be registered and equipped with a communication device. The registration unit registers the identification information. A grant unit grants an authentication key to the portable terminal device having the registered identification information. A permission unit permits the portable terminal device with the authentication key to operate in cooperation with the communication device, which is equipped to a vehicle to be registered, and the communication device equipped to a vehicle other than the vehicle to be registered. The permission unit does not to permit the portable terminal device without the authentication key to operate in cooperation with the communication device equipped to any vehicle.

22 Claims, 4 Drawing Sheets

(56) References Cited

U.S. PATENT DOCUMENTS

| | | | |
|---|---|---|---|
| 2007/0038344 A1* | 2/2007 | Oota et al. | 701/29 |
| 2008/0215209 A1* | 9/2008 | Ikeda et al. | 701/36 |
| 2009/0195370 A1* | 8/2009 | Huffman et al. | 340/426.13 |
| 2010/0241857 A1* | 9/2010 | Okude et al. | 713/168 |
| 2011/0239285 A1* | 9/2011 | Shi et al. | 726/7 |
| 2011/0294466 A1* | 12/2011 | Tang et al. | 455/411 |
| 2012/0095642 A1* | 4/2012 | Nishida | 701/31.4 |
| 2012/0142367 A1* | 6/2012 | Przybylski | 455/456.1 |

* cited by examiner

INFORMATION MANAGEMENT SYSTEM AND METHOD FOR MANAGING IDENTIFICATION INFORMATION

CROSS REFERENCE TO RELATED APPLICATION

This application is based on reference Japanese Patent Application No. 2011-142834 filed on Jun. 28, 2011, the disclosure of which is incorporated herein by reference.

TECHNICAL FIELD

The present disclosure relates to an information management system. The present disclosure further relates to a method for managing identification information of a portable terminal device.

BACKGROUND

Known systems are configured to register user information in an information center, which is communicable with a portable terminal device such as a mobile phone, and to perform user authentication on the basis of the registration information when providing a variety of services. For example, in a system disclosed in JP-A-2004-248042, a user ID is issued to a user who has completed user registration processing. In addition, when the user ID is input to a vehicular device, the user ID is transmitted from the vehicular device to the information center, and the information center performs user authentication.

In the above system, the user needs to input the user ID to the vehicular device when the user receives a variety of services. This input operation may take time and may require burden to the user. In addition, one vehicular device and one mobile phone are generally associated with each other and are generally registered for each user in the above system. Accordingly, when a person other than the registered user wants to receive a variety of services, for example, when family or friends of the registered user want to use the variety of services, a complicated procedure, such as rewriting the registration information, is required. In addition, when the user wants to use a variety of services in a rental car, for example, the user should also input the user ID to a vehicular device of the rental car. Accordingly, the user ID which is a kind of personal information may be leaked to others. Thus, since the system of the related art may not be user-friendly, further improvements have been desired.

SUMMARY

It is an object of the present disclosure to produce an information management system being user-friendly. It is another object of the present disclosure to produce a method being user-friendly for managing identification information of a portable terminal device.

According to an aspect of the present disclosure, an information management system configured to manage identification information of a portable terminal device, the portable terminal device being configured to establish a communication with a vehicular communication device equipped to a vehicle thereby to operate in cooperation with the vehicular communication device, the information management system comprises an identification information registration unit configured to associate the identification information of the portable terminal device with identification information of a vehicle, which is to be registered and equipped with the vehicular communication device, and to register the identification information of the portable terminal device. The information management system further comprises an authentication key grant unit configured to grant an authentication key to the portable terminal device having the identification information registered by the identification information registration unit. The information management system further comprises a cooperative operation permission unit configured to permit the portable terminal device with the authentication key to operate in cooperation with the vehicular communication device equipped to a vehicle to be registered, to permit the portable terminal device with the authentication key to operate in cooperation with the vehicular communication device equipped to a vehicle other than the vehicle to be registered, and not to permit the portable terminal device without the authentication key to operate in cooperation with the vehicular communication device equipped to any vehicle.

According to another aspect of the present disclosure, a method for managing identification information of a portable terminal device, which is configured to establish communication with a vehicular communication device equipped to a vehicle thereby to operate in cooperation with the vehicular communication device, the method comprises associating the identification information of the portable terminal device with identification information of a vehicle, which is to be registered and equipped with the vehicular communication device, and registering the identification information of the portable terminal device. The method further comprises granting an authentication key to the portable terminal device having the identification information, which is registered. The method further comprises permitting the portable terminal device with the authentication key to operate in cooperation with the vehicular communication device equipped to a vehicle to be registered and permitting the portable terminal device with the authentication key to operate in cooperation with the vehicular communication device equipped to a vehicle other than the vehicle to be registered. The method further comprises not permitting the portable terminal device without the authentication key to operate in cooperation with the vehicular communication device equipped to any vehicle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
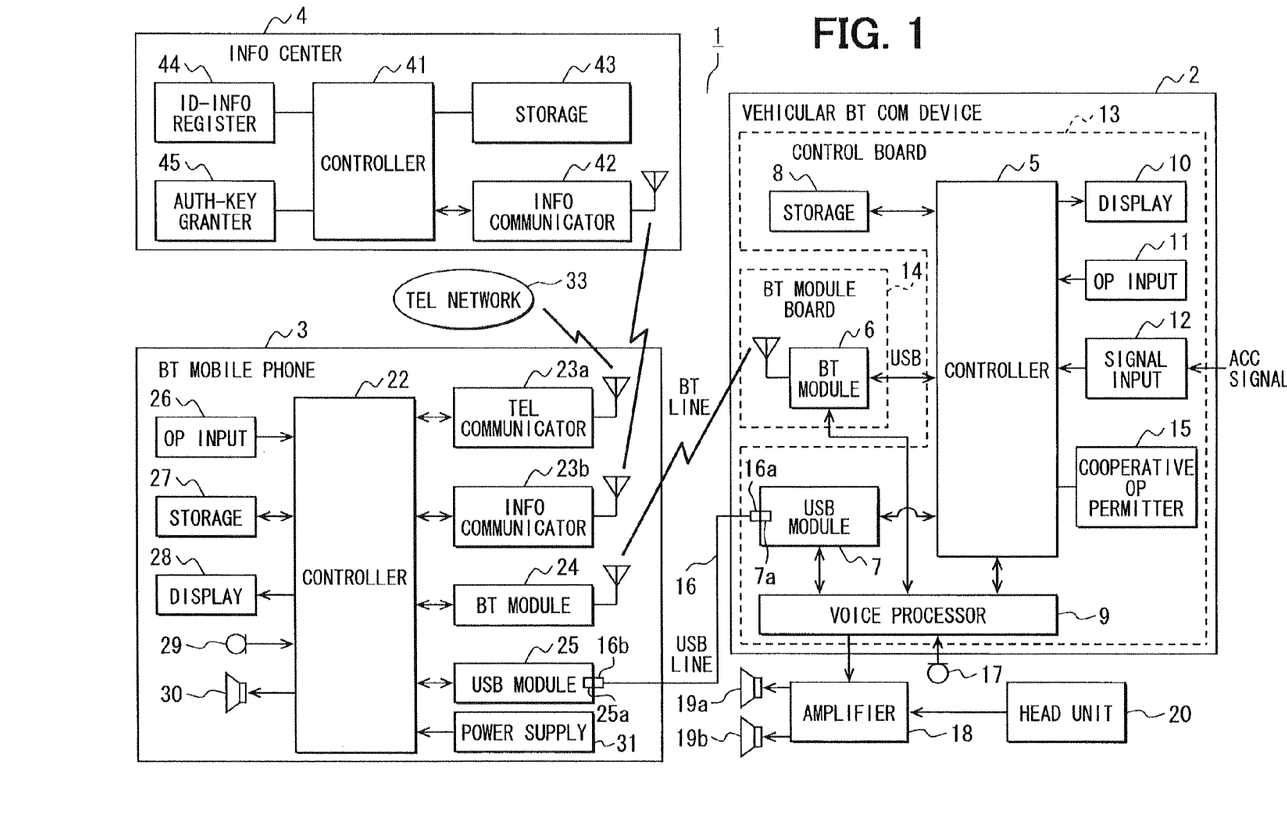
FIG. 1 is a functional block diagram showing an embodiment of the present disclosure.

Hereinafter, an embodiment of the present disclosure will be described with reference to the accompanying drawings. The present embodiment will be described with the following configuration. Herein, a BT-enabled mobile phone (hereinafter, simply referred to as a mobile phone) having a Bluetooth (registered trademark; hereinafter, referred to as BT) communication function as a near field communication function is carried in a vehicle. The vehicle is equipped with a vehicular communication device. In addition, it is determined that BT communication between the vehicular communication device and the mobile phone is possible. That is, it is determined that near field communication between the vehicular communication device and the mobile phone is possible. In addition, naturally, the vehicular communication device is also formed as a BT-enabled device with a BT communication function. An information management system 1 includes a vehicular communication device 2 equipped to the vehicle, a mobile phone 3 carried in the vehicle, and an information center 4 which is communicable with the mobile phone 3 through a radio communication line. The mobile phone 3 is equivalent to a portable terminal device referred to in the present disclosure, and the information center 4 is equivalent to an external server referred to in the present disclosure.

The vehicular communication device 2 is configured to include a control unit 5, a BT module 6, a universal serial bus (USB) module 7, a storage unit 8, a voice processor 9, a display unit 10, an operation input unit 11, and a signal input unit 12. The control unit 5, the USB module 7, the storage unit 8, the voice processor 9, the display unit 10, the operation input unit 11, and the signal input unit 12 are physically mounted on a control board 13. The BT module 6 is physically mounted on a BT module board 14 which is a different component from the control board 13. The control unit 5 and the BT module 6 have a USB interface and are connected to each other through a USB communication line.

The control unit 5 has a CPU configured with a known microcomputer, a RAM, a ROM, an I/O bus, and the like, and performs overall control of an operation such as a communication operation or a data management operation of the vehicular communication device 2. In addition, the control unit 5 enables a cooperative operation permission processing unit 15 virtually with software by executing a control program in the CPU. The cooperative operation permission processing unit 15 is equivalent to a cooperative operation permission unit referred to in the present disclosure. The cooperative operation permission processing unit 15 performs processing for permitting the mobile phone 3 with an authentication key, which will be described later, to operate in cooperation with the vehicular communication device 2 equipped to a vehicle to be registered. The cooperative operation permission processing unit 15 further performs processing for permitting the mobile phone 3 with an authentication key to operate in cooperation with a vehicular communication device equipped to a vehicle other than the vehicle to be registered. On the other hand, the cooperative operation permission processing unit 15 performs processing for not permitting the mobile phone 3 with no authentication key to operate in cooperation with a vehicular communication device equipped to any vehicle.

The BT module 6 has a function of conducting BT communication with a BT module of the mobile phone 3, which will be described later, through a BT communication line which is a near field communication line. The BT module 6 is configured such that multiple profiles specified by the BT communication standards can be simultaneously connected thereto, what is called, multiple connection is possible. The multiple profiles represent a communication protocol defined for each function. In this case, an SPP (Serial Port Profile) which specifies data communication as a virtual serial port, an HFP which specifies a hands free calling (Hands Free Profile), a PBAP which specifies transfer of phone book data (Phone Book Access Profile), an OPP which similarly specifies transfer of phone book data (Object Push Profile), an A2DP which specifies transfer of audio data (Advanced Audio Distribution Profile), an AVRCP which specifies transfer of control data related to control of audio data (Audio/Video Remote Control Profile), a DUN (Dial-up Networking Profile) which specifies a dialup connection to the Internet, a MAP which specifies transfer of electronic mail data (Message Access Profile), and the like are specified as the profiles. Various kinds of data can be transmitted between the BT module 6 and a BT module of the mobile phone 3, which will be described later, through the BT communication line.

The USB module 7 has a connection terminal 7a to or from which one connection terminal 16a of a USB connection cable 16 can be connected or disconnected. The USB module 7 connects the USB communication line, which is a near field communication line, to the USB module of the mobile phone 3 in a state where one connection terminal 16a of the USB connection cable 16 is connected to the connection terminal 7a and the other connection terminal 16b of the USB connection cable 16 is connected to a connection terminal of a USB module of the mobile phone 3 which will be described later, so that USB communication is conducted by the USB communication line. Various kinds of data can be transmitted between the USB module 7 and a USB module of the mobile phone 3, which will be described later, through the USB communication line. The storage unit 8 is formed by a non-volatile storage medium, for example, a hard disk drive, and is configured to have a storage region where various kinds of data are stored. In addition, a coordination application which enables a cooperative operation function is stored in the storage unit 8.

A microphone 17 located at the place where the voice of a user is easily collected, for example, near the handle in the vehicle is connected to the voice processor 9. An audio amplifier 18 located outside the vehicular communication device 2 is also connected to the voice processor 9. Speakers 19a and 19b are connected to the audio amplifier 18. When the voice of the user is input as transmitted voice data through the microphone 17 in a state where the BT communication line is connected between the BT module 6 and the BT module of the mobile phone 3 which will be described later, the voice processor 9 outputs the input transmitted voice data to the BT module 6 after voice processing. When the received voice data is input from the BT module 6 in the above state, the voice processor 9 outputs the input received voice data to the audio amplifier 18.

When the received voice data or audio data is input from the voice processor 9, the audio amplifier 18 amplifies the input received voice data or audio data and outputs it through the speakers 19a and 19b. In addition, a head unit 20 is connected to the audio amplifier 18. For example, when music sound reproduced from a recording medium for music by the head unit 20 or a radio program received from a radio station is input from the head unit 20, the audio amplifier 18 amplifies the input music sound or radio program and outputs it through the speakers 19a and 19b. The display unit 10 is configured with a display device, for example. When a display instruction signal is input from the control unit 5, the display unit 10 displays various display screens on the basis of the input display instruction signal.

The operation input unit 11 is configured to include user-operable various keys or operation devices such as a touch switch formed on the display screen of the display unit 10. The operation input unit 11 outputs an operation detection signal to the control unit, 5 in response to the user's operation on the keys or the touch switch, and the control unit 5 specifies the operation of the user by analyzing the operation detection signal input from the operation input unit 11. The signal input unit 12 is connected to an ACC (accessory) switch equipped to the vehicle. When an ACC signal output from the ACC switch is input, the signal input unit 12 outputs the input ACC signal to the control unit 5. The control unit 5 turns on and off the device power on the basis of ON/OFF of the ACC signal input from the signal input unit 12. Specifically, the control unit 5 turns on the device power, that is, starts the vehicular communication device 2 at the timing at which the ACC signal changes from OFF to ON, and turns off the device power, that is, stops the vehicular communication device 2 at the timing at which the ACC signal changes from ON to OFF.

Subsequently, the configuration of the mobile phone 3 will be described. The mobile phone 3 is configured to include a control unit 22, a telephone communication unit 23a, an information communication unit 23b, a BT module 24, a USB module 25, an operation input unit 26, a storage unit 27, a display unit 28, a microphone 29, a speaker 30, a power supply unit 31, and the like. The control unit 22 has a CPU configured with a known microcomputer, a RAM, a ROM, an I/O bus, and the like, and performs overall control of an operation such as a communication operation or a data management operation of the mobile phone 3. The telephone communication unit 23a executes telephone communication with a telephone communication network 33. In addition, the telephone communication network 33 includes well-known facilities which provide mobile phone communication services, such as a mobile phone base station and a base station controller. The information communication unit 23b executes various kinds of information communication with the external information center 4 through a wide area communication network, for example.

The BT module 24 has a function of conducting BT communication with the BT module 6 of the vehicular communication device 2 described above through the BT communication line. The BT module 24 is configured such that multiple profiles specified by the BT communication standards can be simultaneously connected thereto. The USB module 25 has a connection terminal 25a to or from which the other connection terminal 16b of the USB connection cable 16 can be connected or disconnected. The USB module 25 connects the USB communication line to the USB module 7 of the vehicular communication device 2 in a state where one connection terminal 16a of the USB connection cable 16 is connected to the connection terminal 7a of the USB module 7 of the vehicular communication device 2 and the other connection terminal 16b of the USB connection cable 16 is connected to the connection terminal 25a. Thus, the USB communication is conducted by the USB communication line.

The operation input unit 26 is configured to include user-operable various keys or operation devices such as a touch switch formed on the display screen of the display unit 28. The operation input unit 26 outputs an operation detection signal to the control unit 22 in response to the user's operation on the keys or the touch switch, and the control unit 22 specifies the operation of the user by analyzing the operation detection signal input from the operation input unit 26. The storage unit 27 is configured with a nonvolatile storage medium, for example, a hard disk drive, and is configured to have a storage region where various kinds of data, such as authentication keys distributed, that is, given from the information center 4 in such a manner described later, is stored. In addition, a coordination application which renders a cooperative operation function is stored in the storage unit 27.

The display unit 28 is configured with a display device, for example. When a display instruction signal is input from the control unit 22, the display unit 28 displays various display screens on the basis of the input display instruction signal. The voice of the user is input to the microphone 29, as a transmitted voice, and the speaker 30 outputs the voice from the call partner, which is received through the telephone communication unit 23a, as a received voice. The power supply unit 31 supplies electric power discharged from a battery (not shown), which is detachably provided in the main body, to each functional block as operating power.

The mobile phone 3 is a partner device for communication with the vehicular communication device 2. The mobile phone 3 has both a USB communication line and a BT communication line, as resources which transmit various kinds of data to the vehicular communication device 2, in a state where the USB communication line is connected between the USB module 7 and the USB module 25 and the BT communication line is connected between the BT module 6 and the BT module 24 as described above. When the mobile phone 3 has both the USB communication line and the BT communication line as resources which transmit various kinds of data to the vehicular communication device 2, as described above, the mobile phone 3 transmits various kinds of data from any resource of the USB communication line and the BT communication line to the vehicular communication device 2 after receiving an output start request command, which indicates a request to start the output of various kinds of data, from the vehicular communication device 2.

In addition, the vehicular communication device 2 and the mobile phone 3 have a function of operating cooperatively by starting the coordination application installed in each of them in a state where they are connected to each other through the communication line. That is, the vehicular communication device 2 and the mobile phone 3 are configured to enable a cooperative operation function in a state where they are connected to each other through the communication line. In this case, for example, the application executed in the vehicular communication device 2 can be operated in the mobile phone 3 or the application executed in the mobile phone 3 can be operated in the vehicular communication device 2 on the contrary. Alternatively, in this case, the application executed in the vehicular communication device 2 can be output through the display unit 28 or the speaker 30 of the mobile phone 3. Alternatively, the application executed in the mobile phone 3 can be output through the display unit 10 or the speakers 19a and 19b of the vehicular communication device 2 on the contrary.

Subsequently, the configuration of the information center 4 will be described. The information center 4 is configured to include a control unit 41, an information communication unit 42, and a storage unit 43. The control unit 41 has a CPU configured with a known microcomputer, a RAM, a ROM, an I/O bus, and the like, and performs overall control of an operation such as a communication operation or a data management operation of the information center 4. In addition, this control unit 41 renders an identification information registration processing unit 44 and an authentication key granting processing unit 45 virtually with software by executing a control program in the CPU. The identification information registration processing unit 44 is equivalent to an identification information registration unit referred to in the present disclosure, and the authentication key granting processing unit 45 is equivalent to an authentication key grant unit referred to in the present disclosure.

The information communication unit 42 executes communication of various kinds of information with each mobile phone 3, which has the information communication unit 23b, through a wide area communication network, for example. The storage unit 43 is configured with a nonvolatile storage medium, for example, a hard disk drive, and is configured to have a storage region where various kinds of data are stored.

The control unit 41 stores various kinds of information in the latest state in the storage unit 43. Each mobile phone 3 is configured to download and acquire various kinds of information from the information center 4 through the information communication unit 23b. In this case, an authentication key distributed only to the mobile phone 3, which satisfies predetermined conditions, various kinds of application data, various kinds of content data, and the like are included in the data that the mobile phone 3 acquires from the information center 4.

Figure 4:
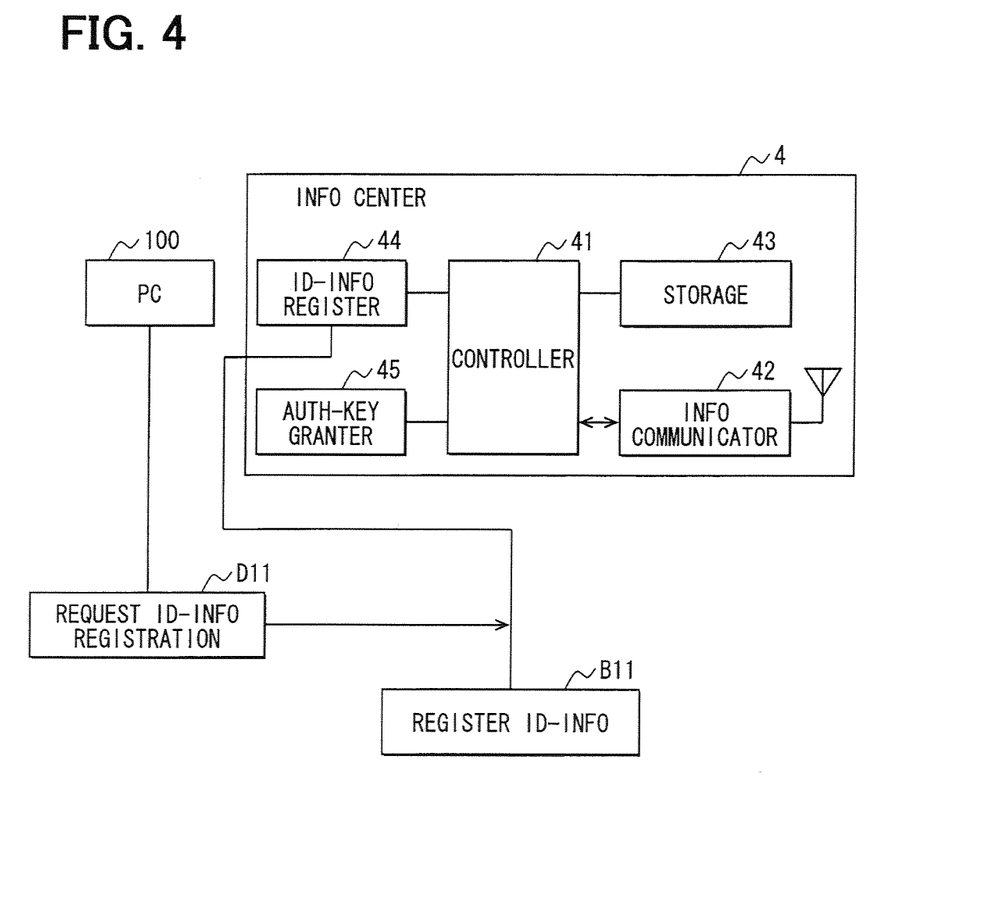
FIG. 4 is a functional block diagram showing the signal transfer between an information communication apparatus and an information center.

The identification information registration processing unit 44 executes identification information registration processing. That is, the identification information registration processing unit 44 executes processing of registering portable terminal identification information, which is the identification information of the mobile phone 3. Thus, the identification information registration processing unit 44 associates the portable terminal identification information with vehicle identification information, which is the identification information of a vehicle to be registered to which the vehicular communication device 2 is equipped and a mobile user ID which is the information identifying the owner of the mobile phone 3. In this case, as shown in FIG. 4, the identification information registration processing unit 44 executes the identification information registration processing (B11), for example, when the employee of the automobile dealership or the purchaser of the vehicle sends a request D11 for identification information registration processing to the information center 4 through an information communication apparatus 100, such as a personal computer (PC).

That is, for example, when purchasing a vehicle, to which the vehicular communication device 2 is equipped, an employee of the automobile dealership or the purchaser of the vehicle requests identification information registration processing by inputting to the information communication apparatus, such as a personal computer, the identification information of the vehicle (that is, a vehicle (purchased vehicle) to be registered), the identification information of the mobile phone 3 which needs to operate in cooperation with the vehicular communication device 2 equipped to the vehicle (for example, the identification information of the mobile phone 3 that the purchaser of the vehicle, has), and the mobile user ID which is the identification information of the owner of, the mobile phone 3. In response to this request, the control unit 41 of the information center 4 causes the identification information registration processing unit 44 to register the identification information of the mobile phone 3 (that is, the portable terminal identification information) and the identification information of the owner of the mobile phone 3 (that is, the mobile user ID) in the storage unit 43 so as not to associate the identification information of the vehicular communication device 2 equipped to the vehicle to be registered (the purchased vehicle) but to associate the identification information of the purchased vehicle itself (that is, the vehicle identification information of the vehicle to be registered).

In addition, in this case, the identification information of a vehicle is information set for the vehicle at the time of manufacture or shipment of the vehicle. For example, the identification information of a vehicle includes a serial number, an identification code, and a character string arbitrarily selected. The employee of the dealership or the purchaser of a vehicle checks the identification information set for the vehicle, that is, the vehicle identification information on the basis of written contents of the specification, operating instructions, and the contract of the vehicle and written contents of the identification label attached to the vehicle body, for example. In addition, the identification information, that is, the vehicle identification information may be stored in a vehicular device, such as a navigation device, so as to be able to be displayed.

In addition, the identification information of the mobile phone 3 is information set for the mobile phone 3 at the time of manufacture, shipment, or sales contract of the mobile phone 3. For example, the identification information of the mobile phone 3 includes a serial number, a telephone number, an identification code, and a character string arbitrarily selected. The employee of the dealership or the purchaser of a vehicle checks the identification information set for the mobile phone 3, that is, the portable terminal identification information on the basis of written contents of the specification, operating instructions, and the contract of the mobile phone 3 and written contents of the identification label attached to the mobile phone 3, for example.

In addition, the mobile user ID is the information set by various methods as information which specifies the owner of the mobile phone 3. For example, the mobile user ID is issued to a person who has purchased the mobile phone 3 at the time of purchase of the mobile phone 3. In addition, in this case, identification information of the multiple mobile phones 3 (for example, five mobile phones 3) may be registered so as to associate the multiple mobile phones 3 with one vehicle. Therefore, for example, identification information of the mobile phones 3 that family members of the purchaser of the vehicle own may also be registered in the storage unit 43 so as to associate the mobile phones 3 with the identification information of one purchased vehicle.

The authentication key granting processing unit 45 executes processing of granting an authentication key to the mobile phone 3 whose portable terminal identification information is registered in the storage unit 43 by the identification information registration processing of the identification information registration processing unit 44. In this case, the control unit 41 searches for whether or not the portable terminal identification information of the mobile phone 3 is registered in the storage unit 43 when the grant of an authentication key is requested from the mobile phone 3. In addition, when the identification information is registered as a result of the search processing, the control unit 41 distributes an authentication key to the mobile phone 3 using the authentication key granting processing unit 45. When the identification information is not registered, the control unit 41 does not distribute an authentication key to the mobile phone 3. For example, request for grant of the authentication key from the mobile phone 3 may be executed in response to the user's operation on the operation input unit 26, or may be executed automatically with predetermined conditions as a trigger. For example, "predetermined time elapses after the identification information of the mobile phone 3 is registered" and "a power supply system of a purchased vehicle is turned on for the first time after the identification information of the mobile phone 3 is registered" may be set as the predetermined conditions.

Figure 2:
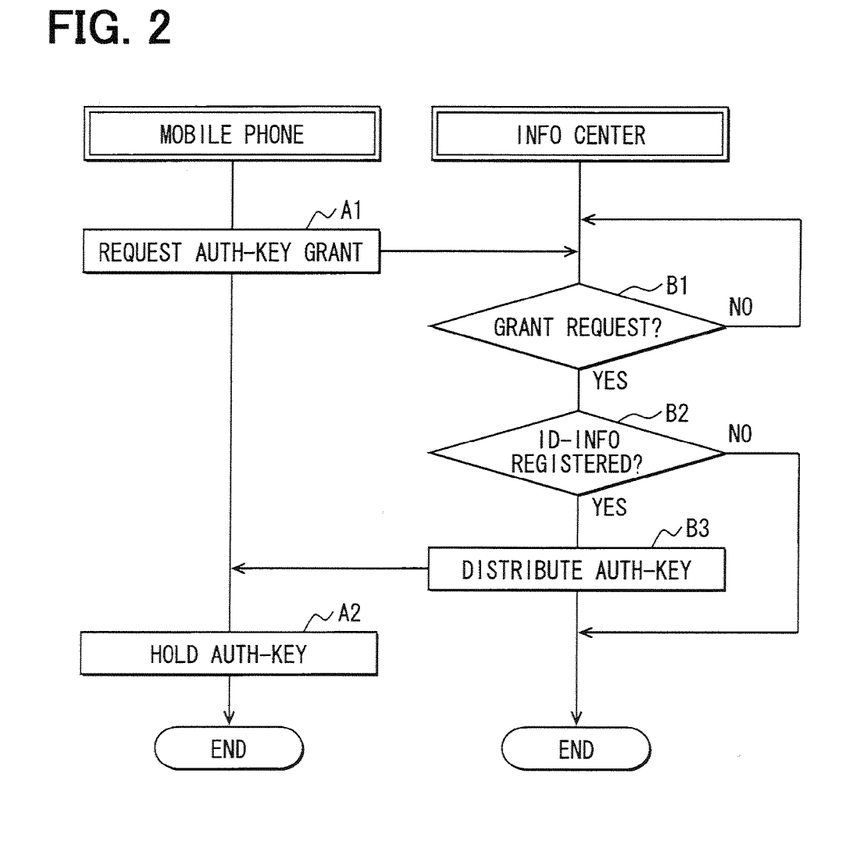
FIG. 2 is a flow chart showing operations of a mobile phone and an information center.
Figure 3:
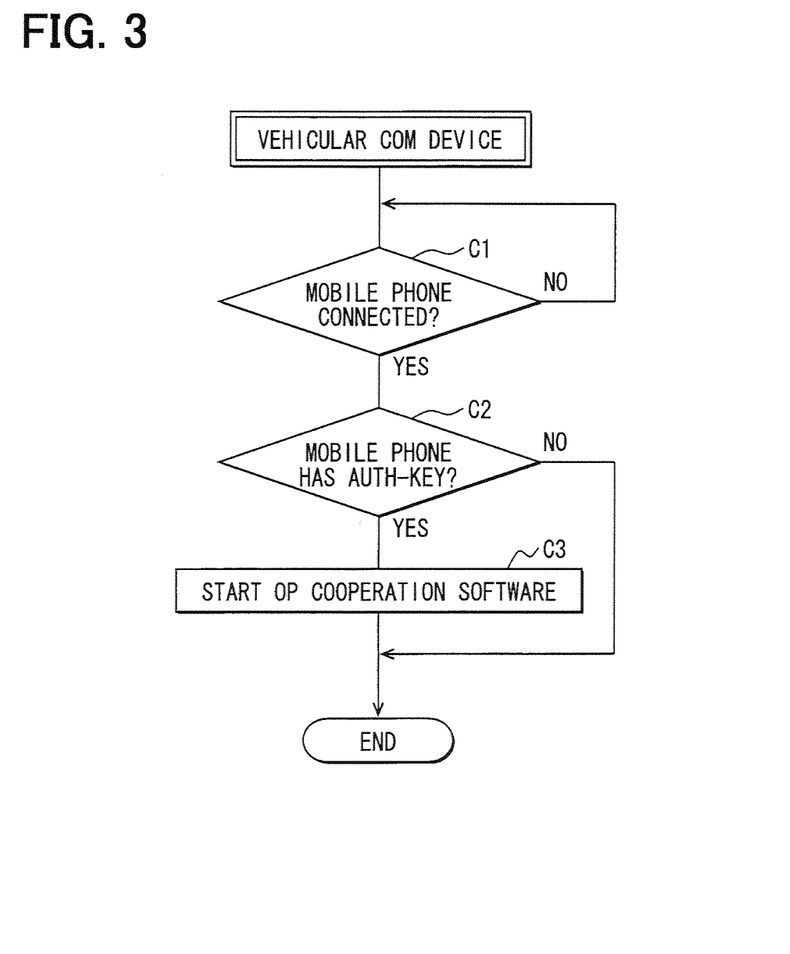
FIG. 3 is a flow chart showing an operation of a vehicular communication device.

Subsequently, an operation in the above embodiment will be described with reference to FIGS. 2 and 3. First, an operation when the information center 4 grants an authentication key to the mobile phone 3 will be described with reference to the flow chart shown in FIG. 2. Specifically, the control unit 22 of the mobile phone 3 requests the information center 4 to grant an authentication key (step A1). In this case, the control unit 22 sends notification of the identification information of the mobile phone 3 to the information center 4 together with request for grant of an authentication key. On the other hand, the control unit 41 of the information center 4 monitors whether or not a request for grant of an authentication key from the mobile phone 3 has been received (step B1). When the request for grant of an authentication key from the mobile phone 3 has been received (step B1: YES), the control unit 41 of the information center 4 determines whether the identification information notified from the mobile phone 3, that is, the identification information of the mobile phone 3 which has sent the request for grant of an authentication key is registered (step B2).

In addition, when the identification information of the mobile phone 3 which has sent the request for grant of an authentication key is registered (step B2: YES), the control unit 41 distributes, that is, grants an authentication key to the mobile phone 3 (step B3), and this processing ends. On the other hand, when the identification information of the mobile phone 3 which has sent the request for grant of an authentication key is not registered (step B2: NO), the control unit 41 ends this processing without distributing an authentication key. The control unit 22 of the mobile phone 3 to which the authentication key from the information center 4 has been granted stores and holds the authentication key in the storage unit 27 (step A2), and this processing ends.

Subsequently, an operation when the information center 2 gives permission or no permission to operate in cooperation with the mobile phone 3 will be described with reference to the flow chart shown in FIG. 3. In addition, it is assumed that the control unit 22 of the mobile phone 3 starts a coordination application installed in the mobile phone 3 at least before processing at step C3, which will be described later, is executed. A stage for which the mobile phone 3 is communicably connected to the vehicular communication device 2 may be set as an example of the stage before the processing at step C3 is executed. The control unit 5 of the vehicular communication device 2 monitors whether or not the mobile phone 3 is communicably connected to the vehicular communication device 2 (step C1). In addition, when the mobile phone 3 is communicably connected to the vehicular communication device 2, that is, when a BT communication line or a USB communication line is established between the vehicular communication device 2 and the mobile phone 3 (step C1: YES), the control unit 5 determines whether or not the connected mobile phone 3 has an authentication key (step C2).

Determination regarding whether or not the mobile phone 3 connected to the vehicular communication device 2 has an authentication key can be conducted with the following processing, for example. That is, the control unit 22 of the mobile phone 3 with an authentication key transmits the authentication key possession information, which is information indicating that it has an authentication key, or the authentication key itself to the vehicular communication device 2. In addition, the control unit 5 of the vehicular communication device 2 determines that the connected mobile phone 3 has an authentication key when the authentication key possession information or the authentication key itself is received from the connected mobile phone 3. The control unit 5 of the vehicular communication device 2 further determines that the connected mobile phone 3 has no authentication key when the authentication key possession information or the authentication key itself is not received from the connected mobile phone 3. In addition, the control unit 5 of the vehicular communication device 2 may also determine whether or not the mobile phone 3 has an authentication key by searching for whether or not the authentication key is stored in the storage unit 27 by referring to the storage unit 27 of the connected mobile phone 3 through the communication line.

When the connected mobile phone 3 has an authentication key (step C2: YES), the control unit 5 starts the coordination application installed in the vehicular communication device 2 (step C3) to set a state where the vehicular communication device 2 and the mobile phone 3 operate cooperatively, that is, a cooperative operation enabled state, in order to permit the mobile phone 3 to operate in cooperation with the vehicular communication device 2, and this processing ends.

When the user operates the coordination application stored in the vehicular communication device 2 in this state, a coordination application stored in the mobile phone 3 operates cooperatively. In addition, the mobile phone 3 communicates with the information center 4 in response to an instruction from the vehicular communication device 2, and receives a variety of services that are specific to the user from the information center 4. That is, since the information center 4 manages not only the identification information of the mobile phone 3 but also the mobile user ID which identifies the owner of the mobile phone 3, the owner of the mobile phone 3 can be specified by communication with the mobile phone 3. Therefore, music, sound, and a radio program that are specific to the user can be provided from a content server (not shown) provided inside or outside the information center 4, or reservations of facilities, such as restaurants, or tickets can be made in the name of the user.

On the other hand, when the connected mobile phone 3 has no authentication key (step C2: NO), the control unit 5 ends this processing without starting the coordination application. In this case, therefore, the vehicular communication device 2 and the mobile phone 3 cannot operate cooperatively. That is, the vehicular communication device 2 and the mobile phone 3 become in a cooperative operation disabled state. In addition, the mobile phone 3 with the authentication key distributed from the information center 4 can also operate in cooperation with a vehicular communication device whose vehicle identification information is associated with the identification information, that is, the portable terminal identification information (that is, in cooperation with a vehicular communication device equipped to a different vehicle from the vehicle to be registered) by establishing a communication line therebetween and is registered. That is, for example, a vehicular communication device equipped to a rental car or a company-owned car which is different from a purchased vehicle (that is, a vehicle to be registered) determines whether or not the mobile phone 3 has an authentication key when the mobile phone 3 is communicably connected to the vehicular communication device. In addition, when the mobile phone 3 has an authentication key, the coordination application is started so that the vehicular communication device and the mobile phone 3 can operate cooperatively. On the other hand, when the mobile phone 3 has no authentication key, the coordination application is not started so that the vehicular communication device and the mobile phone 3 cannot operate cooperatively.

As described above, according to the present embodiment, the control unit 41 of the information center 4 in the information management system 1, which manages the identification information of the mobile phone 3 that operates in cooperation with the vehicular communication device 2 by establishing a communication line between itself and the vehicular communication device 2 equipped to a vehicle. The control unit 41 further associates the identification information of the mobile phone 3, that is, the portable terminal identification information with the identification information of the vehicle to be registered, to which the vehicular communication device 2 is equipped, using the identification information registration processing unit 44 and registers the identification information of the mobile phone 3. The control unit 41 further grants an authentication key only to the mobile phone 3 whose portable terminal identification information is registered using the authentication key granting processing unit 45. In addition, the control unit 5 of the vehicular communication device 2 starts a coordination application by making the cooperative operation permission processing unit 15 permit the mobile phone 3 with an authentication key to operate in cooperation with the vehicular communication device 2 equipped to the vehicle to be registered. Alternatively, the control unit 5 starts a coordination application by making the cooperative operation permission processing unit 15 permit the mobile phone 3 with an authentication key to operate in cooperation with a vehicular communication device equipped to a vehicle other than the vehicle to be registered. On the other hand, the control unit 5 of the vehicular communication device 2 is configured not to start a coordination application by making the cooperative operation permission processing unit 15 not permit the mobile phone 3 with no authentication key to operate in cooperation with a vehicular communication device equipped to any vehicle.

That is, a service for enabling the execution of a function of operation cooperation which is to establish a communication line between the vehicular communication device 2 equipped to a vehicle and the mobile phone 3 is provided so that the vehicular communication device 2 and the mobile phone 3 operate cooperatively (in short, when providing an operation cooperation service), in the following way. Specifically, an authentication key is granted to the mobile phone 3 by associating the identification information of the mobile phone 3 (that is, the portable terminal identification information) with not the identification information of the vehicular communication device 2 but the identification information of the vehicle to which the vehicular communication device 2 is equipped (that is, the vehicle identification information) and by registering the identification information. Then (in other words, after the grant of an authentication key), the mobile phone 3 can execute the function of operation cooperation with a vehicular communication device equipped to any vehicle as long as the mobile phone 3 has the authentication key, that is, an authentication key granted when the identification information is registered together with the identification information of the vehicle. Thus, the operation cooperation service which is for operating, the vehicular communication device 2 and the mobile phone 3 cooperatively is provided on condition that the mobile phone 3 has an authentication key. Accordingly, the user does not need to input a user ID or rewrite the registration information when receiving the operation cooperation service. As a result, a user-friendly information management system can be realized for the user.

In addition, according to the present embodiment, the mobile phone 3 with an authentication key can operate in cooperation with a vehicular communication device equipped to a different vehicle from the vehicle to be registered whose identification information is associated with the identification information of the mobile phone 3 and is registered by the identification information registration processing unit 44, for example, a rental car or a company-owned car. That is, once an authentication key is granted, the mobile phone 3 can execute the function of operation cooperation even with a vehicular communication device equipped to a different vehicle from the registered vehicle as long as the mobile phone 3 has the authentication key. Accordingly, the user does not need to input a user ID or rewrite the registration information whenever a vehicle is replaced. As a result, a more user-friendly information management system can be realized for the user.

In addition, according to the present embodiment, the control unit 41 of the information center 4 makes the identification information registration processing unit 44 associate the identification information of the mobile phone 3 with not only the identification information of the vehicle to be registered but also the identification information of the owner of the mobile phone 3 and register the identification information of the mobile phone 3. In addition, the control unit 22 of the mobile phone 3 communicates with the information center 4 in response to an instruction from a vehicular communication device which is communicably connected to the mobile phone 3, and receives services that are specific to the owner of the mobile phone 3 from the information center 4. Services that are specific to the owner of the mobile phone 3 can be provided by associating the identification information of the mobile phone 3 with not only the identification information of the vehicle to be registered but also the identification information of the owner of the mobile phone 3 and by registering the identification information of the mobile phone 3, as described above.

In addition, in the present embodiment, identification information of the multiple mobile phones 3 can be registered for the identification information of one vehicle to be registered. In this case, for example, identification information of the mobile phones 3 that family members of the purchaser of the vehicle own may also be associated with the identification information of one vehicle to be registered and may also be registered. Accordingly, the multiple mobile phones 3 can also execute the function of operation cooperation with a vehicular communication device equipped to any vehicle as long as they have authentication keys.

In addition, according to the present embodiment, the control unit 41 of the information center 4 makes the authentication key granting processing unit 45 grant an authentication key to the mobile phone 3 in response to the request for grant of an authentication key from the mobile phone 3. That is, an authentication key is granted in response to the request for grant of an authentication key from the mobile phone 3. Therefore, an authentication key is granted to only the mobile phone 3 which needs an authentication key (that is, the mobile phone 3 which requests the grant of an authentication key), while no authentication key is granted to the mobile phone 3 which does not need an authentication key (that is, the mobile phone 3 which does not request the grant of an authentication key). As a result, the leaking of authentication keys more than necessary can be restricted.

In addition, the present disclosure is not limited to only one embodiment described above, and may be applied to various embodiments without departing from the scope and spirit of the present disclosure. For example, the present disclosure may be modified or extended as follows.

Determination regarding whether or not the mobile phone 3 has an authentication key, that is, determination at step C2 may also be performed by the control unit 41 of the information center 4, for example, instead of being performed by the control unit 5 of the vehicular communication device 2. Such a configuration can be produced by the following processing, for example. That is, the control unit 22 of the mobile phone 3 with an authentication key transmits the authentication key possession information or the authentication key itself to the information center 4 with being communicably connected to the vehicular communication device 2 as a trigger. In addition, the control unit 41 of the information center 4 determines that the mobile phone 3 has an authentication key when the authentication key possession information or the authentication key itself is received from the mobile phone 3 connected to the vehicular communication device 2. In addition, the control unit 41 further determines that the mobile phone 3 has no authentication key when the authentication key possession information or the authentication key itself is not received from the mobile phone 3. In addition, when it is determined that the mobile phone 3 has an authentication key, the control unit 41 of the information center 4 transmits information indicating that it has confirmed that the mobile phone 3 under current connection has an authentication key, as authentication key possession confirmation information, to the vehicular communication device 2 to which the mobile phone 3 is connected. The control unit 5 of the vehicular communication device 2 determines that the mobile phone 3, that is, the mobile phone 3 under current connection has an authentication key when the authentication key possession confirmation information is received from the information center 4. In addition, the control unit 5 further determines that the mobile phone 3 has no authentication key when the authentication key possession confirmation information is not received from the information center 4.

The portable terminal device is not limited to the mobile phone 3, and various portable communication terminals may be adopted.

The vehicular communication device 2 may be configured with a portable radio device which is detachably provided in a vehicle, for example, instead of being configured with the vehicular device built in a vehicle.

Approximately a distance which covers the inside of a normal vehicle is mainly assumed as the near field communication referred to in the present embodiment. However, the near field communication can be executed while changing the distance range appropriately according to various factors, such as the type or size of a vehicle, communication performance of the vehicular communication device 2, and communication performance of the mobile phone 3. Accordingly, a communication function appropriate for the distance range can be used.

The present disclosure relates to an information management system configured to manage identification information of a portable terminal device that operates in cooperation with a vehicular communication device equipped to a vehicle by establishing a communication line between the portable terminal device and the vehicular communication device. An identification information registration unit associates identification information of a vehicle, which is to be registered and equipped with the vehicular communication device, and registers the identification information of the portable terminal device. An authentication key grant unit grants an authentication key to the portable terminal device whose identification information is registered by the identification information registration unit. In addition, a cooperative operation permission unit permits the portable terminal device with the authentication key to operate in cooperation with the vehicular communication device equipped to the vehicle to be registered and also permits the portable terminal device with the authentication key to operate in cooperation with the vehicular communication device equipped to a vehicle other than the vehicle to be registered. The cooperative operation permission unit does not permit the portable terminal device, which does not have the authentication key, to operate in cooperation with the vehicular communication device equipped to any vehicle.

That is, when providing a service for enabling the execution of an operation cooperation function which is to establish a communication line between a vehicular communication device equipped to a vehicle and a portable terminal device so that the vehicular communication device and the portable terminal device operate cooperatively (in short, when providing an operation cooperation service), an authentication key is granted to the portable terminal device by associating the identification information of the vehicle to which the vehicular communication device is equipped (that is, the vehicle identification information) and by registering the identification information of the portable terminal device (that is, the portable terminal device identification information). Then, the portable terminal device can execute the function of operation cooperation with a vehicular communication device equipped to any vehicle as long as the portable terminal device has the authentication key, that is, an authentication key granted when the identification information is registered together with the identification information of the vehicle. Thus, the operation cooperation service which is for operating the vehicular communication device and the portable terminal device cooperatively is provided on condition that the portable terminal device has an authentication key. Accordingly, the user does not need to input a user ID or rewrite the registration information when receiving the operation cooperation service. As a result, a user-friendly information management system can be realized for the user.

In addition, the portable terminal device with an authentication key can also operate in cooperation with a vehicular communication device equipped to a different vehicle from the vehicle to be registered whose identification information is associated with the identification information of the portable terminal device and registered by the identification information registration unit. That is, once an authentication key is granted, the portable terminal device can execute the function of operation cooperation even with a vehicular communication device equipped to a different vehicle from the registered vehicle as long as the portable terminal device has the authentication key. Accordingly, the user does not need to input a user ID or rewrite the registration information whenever a vehicle is replaced. As a result, a more user-friendly information management system can be realized for the user.

The identification information registration unit may associate the identification information of the vehicle to be registered with identification information of an owner of the portable terminal device and may register the identification information of the portable terminal device. In this case, the portable terminal device may communicate with an external server in response to an instruction from the vehicular communication device and may receive a service, which is specific to the owner of the portable terminal device, from the server. The service that is specific to the owner of the portable terminal device can be provided by associating not only the identification information of the vehicle to be registered but also the identification information of the owner of the portable terminal device as described above and by registering the identification information of the portable terminal device.

In addition, identification information of multiple portable terminal devices may be registered with respect to identification information of one vehicle to be registered. In this case, for example, identification information of portable terminal devices that family members of the purchaser of the vehicle own may also be associated with the identification information of one vehicle to be registered and may also be registered. Accordingly, the multiple portable terminal devices can also execute the function of operation cooperation with a vehicular communication device equipped to any vehicle as long as they have authentication keys.

The authentication key grant unit may grant the authentication key to the portable terminal device when grant of the authentication key is requested from the portable terminal device. That is, an authentication key is granted in response to the request for grant of an authentication key from the portable terminal device. Therefore, an authentication key is granted to only a portable terminal device which needs an authentication key, while no authentication key is granted to a portable terminal device which does not need an authentication key. As a result, the leaking of authentication keys more than necessary can be restricted.

The above processings such as calculations and determinations are not limited being executed by the control units 5, 22, 41. The control unit may have various structures including the control units 5, 22, 41 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the present disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An information management system comprising:
a server including an identification information registration unit and an authentication key grant unit;
a portable terminal device;
a first vehicular communication device equipped to a first vehicle to be registered and including a first cooperative operation permission unit; and
a second vehicular communication device equipped to a second vehicle other than the first vehicle and including a second cooperative operation permission unit, wherein
the identification information registration unit is configured to register identification information of the portable terminal device in association with identification information of the first vehicle,
the authentication key grant unit is configured to grant an authentication key to the portable terminal device having the identification information registered by the identification information registration unit,
the first cooperative operation permission unit is configured
to permit the portable terminal device with the authentication key to operate in cooperation with the first vehicular communication device when the portable terminal device establishes a communication with the first vehicular communication device, and
not to permit any portable terminal device without the authentication key to operate in cooperation with the first vehicular communication device, and
the second cooperative operation permission unit is configured
to permit the portable terminal device with the authentication key to operate in cooperation with the second vehicular communication device when the portable terminal device establishes a communication with the second vehicular communication device, and
not to permit any portable terminal device without the authentication key to operate in cooperation with the second vehicular communication device, and
the identification information registration unit is configured to register identification information of each of one or more different portable terminal devices in association with the identification information of the first vehicle to be registered.

2. The information management system according to claim 1, wherein
the identification information registration unit is further configured to register the identification information of the portable terminal device in association with both the identification information of the first vehicle and identification information of an owner of the portable terminal device, and
the portable terminal device is configured
to communicate with the server in response to an instruction from one of the first vehicular communication device and the second vehicular communication device, and
to receive a service, which is specific to the owner of the portable terminal device, from the server.

3. The information management system according to claim 1, wherein
the authentication key grant unit is further configured to grant the authentication key to the portable terminal device when the server receives a request of grant of the authentication key and the identification information of the portable terminal device from the portable terminal device and the identification information of the portable terminal device has been registered.

4. The information management system according to claim 1, wherein
each of the first and second vehicular communication devices and the portable terminal device store a common coordination application, and
each of the first and second cooperative operation permission units is further configured to permit a cooperative operation of the common coordination application.

5. The information management system according to claim 1, wherein
the portable terminal device is configured to transmit one of authentication key possession information and the authentication key to the server with being communicably connected to one of the first vehicular communication device and the second vehicular communication device as a trigger,
the server is configured to transmit an authentication key possession confirmation information to the one of the first vehicular communication device and the second vehicular communication device when the server determines that the portable terminal device is authenticated based on the one of authentication key possession information and the authentication key transmitted from the portable terminal device,
the first cooperative operation permission unit is further configured
to permit the portable terminal device to operate in cooperation with the first vehicular communication device when the first vehicular communication device receives the authentication key possession confirmation information, and not to permit the portable terminal device to operate in cooperation with the first vehicular communication device when the first vehicular communication device does not receive the authentication key possession confirmation information, and the second cooperative operation permission unit is further configured to permit the portable terminal device to operate in cooperation with the second vehicular communication device when the second vehicular communication device receives the authentication key possession confirmation information, and not to permit the portable terminal device to operate in cooperation with the second vehicular communication device when the second vehicular communication device does not receive the authentication key possession confirmation information.

6. The information management system according to claim 1, wherein the portable terminal device is configured to transmit one of authentication key possession information and the authentication key to one of the first vehicular communication device and the second vehicular communication device with being communicably connected to the one of the first vehicular communication device and the second vehicular communication device as a trigger, the first cooperative operation permission unit is further configured to permit the portable terminal device to operate in cooperation with the first vehicular communication device when the first vehicular communication device receives the one of the authentication key possession information and the authentication key, and not to permit the portable terminal device to operate in cooperation with the first vehicular communication device when the first vehicular communication device receives neither the authentication key possession information nor the authentication key, and the second cooperative operation permission unit is further configured to permit the portable terminal device to operate in cooperation with the second vehicular communication device when the second vehicular communication device receives the one of the authentication key possession information and the authentication key, and not to permit the portable terminal device to operate in cooperation with the second vehicular communication device when the second vehicular communication device receives neither the authentication key possession information nor the authentication key.

7. The information management system according to claim 1, wherein the portable terminal device includes a storage unit configured to store the authentication key, the first cooperative operation permission unit is further configured to determine whether or not the portable terminal device has the authentication key by searching for whether or not the authentication key is stored in the storage unit when the first vehicular communication device is communicably connected to the portable terminal device, to permit the portable terminal device to operate in cooperation with the first vehicular communication device when determining that the portable terminal device has the authentication key, and not to permit the portable terminal device to operate in cooperation with the first vehicular communication device when determining that the portable terminal device does not have the authentication key, and the second cooperative operation permission unit is further configured to determine whether or not the portable terminal device has the authentication key by searching for whether or not the authentication key is stored in the storage unit when the second vehicular communication device is connected to the portable terminal device, to permit the portable terminal device to operate in cooperation with the second vehicular communication device when determining that the portable terminal device has the authentication key, and not to permit the portable terminal device to operate in cooperation with the second vehicular communication device when determining that the portable terminal device does not have the authentication key.

8. An information management system comprising:

a server including an identification information registration unit and an authentication key grant unit, a portable terminal device;

a first vehicular communication device equipped to a first vehicle to be registered and including a first cooperative operation permission unit; and a second vehicular communication device equipped to a second vehicle other than the first vehicle and including a second cooperative operation permission unit, wherein the identification information registration unit is configured to register identification information of the portable terminal device with identification information of the first vehicle, the authentication key grant unit is configured to grant an authentication key to the portable terminal device having the identification information registered by the identification information registration unit, the portable terminal device is configured to transmit one of authentication key possession information and the authentication key to the server with being communicably connected to one of the first vehicular communication device and the second vehicular communication device as a trigger, the server is configured to transmit an authentication key possession confirmation information to the one of the first vehicular communication device and the second vehicular communication device when determining that the portable terminal device is authenticated based on the one of authentication key possession information and the authentication key transmitted from the portable terminal device, the first cooperative operation permission unit is configured to permit the portable terminal device to operate in cooperation with the first vehicular communication device when the first vehicular communication device receives the authentication key possession confirmation information, and not to permit any portable terminal device to operate in cooperation with the first vehicular communication device when the first vehicular communication device does not receive the authentication key possession confirmation information, and the second cooperative operation permission unit is configured to permit the portable terminal device to operate in cooperation with the second vehicular communication device when the second vehicular communication device receives the authentication key possession confirmation information, and not to permit any portable terminal device to operate in cooperation with the second vehicular communication device when the second vehicular communication device does not receive the authentication key possession confirmation information.

9. The information management system according to claim 8, wherein the identification information registration unit is further configured to register the identification information of the portable terminal device in association with both the identification information of the first vehicle and identification information of an owner of the portable terminal device, and the portable terminal device is further configured to communicate with the server in response to an instruction from one of the first vehicular communication device and the second vehicular communication device and to receive a service, which is specific to the owner of the portable terminal device, from the server.

10. The information management system according to claim 8, wherein the identification information registration unit is further configured to register identification information of each of one or more different portable terminal devices in association with the identification information of the first vehicle.

11. The information management system according to claim 8, wherein the authentication key grant unit is further configured to grant the authentication key to the portable terminal device when the server receives a request of grant of the authentication key and the identification information of the portable terminal device from the portable terminal device and the identification information of the portable terminal device has been registered.

12. The information management system according to claim 8, wherein each of the first and second vehicular communication devices and the portable terminal device store a common coordination application, and each of the first and second cooperative operation permission units is further configured to permit a cooperative operation of the common coordination application.

13. A server communicable with a portable terminal device and one or more different portable terminal devices, the server comprising:

an identification information registration unit configured to register the portable terminal device in association with identification information of a first vehicle and further configured to register each of one or more different portable terminal devices in association with the identification information of the first vehicle; and an authentication key grant unit configured to grant an authentication key to the portable terminal device and to each of the one or more different portable terminal devices having the identification information registered by the identification information registration unit, wherein:

the portable terminal device is communicable with a first vehicular communication device and a second vehicular communication device;

the first vehicular communication device is equipped to the first vehicle registered in the server and includes a first cooperative operation permission unit, the first cooperative operation permission unit is configured to permit the portable terminal device with the authentication key to operate in cooperation with the first vehicular communication device when the portable terminal device establishes a communication with the first vehicular communication device, and not to permit any portable terminal device without the authentication key to operate in cooperation with the first vehicular communication device; and the second vehicular communication device is equipped to a second vehicle other than the first vehicle and includes a second cooperative operation permission unit, the second cooperative operation permission unit is configured to permit the portable terminal device with the authentication key to operate in cooperation with the second vehicular communication device when the portable terminal device establishes a communication with the second vehicular communication device, and not to permit any portable terminal device without the authentication key to operate in cooperation with the second vehicular communication device.

14. A vehicular communication device communicable with a portable terminal device, the portable terminal device being communicable with a server including an identification information registration unit configured to register identification information of the portable terminal device in association with identification information of a first vehicle to be registered and configured to register identification information of each of one or more different portable terminal devices in association with the identification information of the first vehicle to be registered; and an authentication key grant unit configured to grant the authentication key to the portable terminal device having the identification information registered by the identification information registration unit, the vehicular communication device comprising a cooperative operation permission unit configured to permit the portable terminal device with the authentication key to operate in cooperation with the vehicular communication device when the portable terminal device establishes a communication with the vehicular communication device when the vehicular communication device is equipped to the first vehicle to be registered, to permit the portable terminal device with the authentication key to operate in cooperation with the vehicular communication device when the portable terminal device establishes a communication with the vehicular communication device when the vehicular communication device is equipped to a second vehicle different from the first vehicle, not to permit any portable terminal device without the authentication key to operate in cooperation with the vehicular communication device when the vehicular communication device is equipped to the first vehicle, and not to permit any portable terminal device without the authentication key to operate in cooperation with the vehicular communication device when the case where the vehicular communication device is equipped to the second vehicle.

15. A server communicable with a portable terminal device,
  the server comprising:
    an identification information registration unit configured to register identification information of the portable terminal device in association with identification information of a first vehicle; and
    an authentication key grant unit configured to grant an authentication key to the portable terminal device having the identification information registered by the identification information registration unit, wherein:
  the server is configured
    to receive one of authentication key possession information or the authentication key from the portable terminal device communicably connected to one of a first vehicular communication device or a second vehicular communication device, and
    to transmit the authentication key possession confirmation information to the one of the first vehicular communication device or the second vehicular communication device when determining that the portable terminal device is authenticated based on the one of the authentication key possession information or the authentication key transmitted from the portable terminal device;
  the first vehicular communication device is equipped to the first vehicle registered in the server and includes a first cooperative operation permission unit, the first cooperative operation permission unit is configured
    to permit the portable terminal device to operate in cooperation with the first vehicular communication device when the first vehicular communication device receives the authentication key possession confirmation information from the server, and
    not to permit any portable terminal device to operate in cooperation with the first vehicular communication device when the first vehicular communication device does not receive the authentication key possession confirmation information from the server; and
  the second vehicular communication device is equipped to a second vehicle other than the first vehicle and includes a second cooperative operation permission unit, the second cooperative operation permission unit is configured
    to permit the portable terminal device to operate in cooperation with the second vehicular communication device when the second vehicular communication device receives the authentication key possession confirmation information from the server, and
    not to permit any portable terminal device to operate in cooperation with the second vehicular communication device when the second vehicular communication device does not receive the authentication key possession confirmation information from the server.

16. A vehicular communication device communicable with a portable terminal device
  the portable terminal device being communicable with a server including:
    an identification information registration unit configured to register identification information of the portable terminal device in association with identification information of a first vehicle to be registered; and
    an authentication key grant unit configured to grant an authentication key to the portable terminal device having the identification information registered by the identification information registration unit,
  the server being configured
    to receive one of authentication key possession information and the authentication key from the portable terminal device communicably connected to the vehicular communication device, and
    to transmit the authentication key possession confirmation information to the vehicular communication device when determining that the portable terminal device is authenticated based on the one of the authentication key possession information and the authentication key transmitted from the portable terminal device,
  the vehicular communication device comprising a cooperative operation permission unit configured
    to permit the portable terminal to operate in cooperation with the vehicular communication device when the vehicular communication device receives the authentication key possession confirmation information when the vehicular communication device is equipped to the first vehicle to be registered,
    to permit the portable terminal to operate in cooperation with the vehicular communication device when the vehicular communication device receives the authentication key possession confirmation information when the vehicular communication device is equipped to a second vehicle other than the first vehicle, not to permit any portable terminal device to operate in cooperation with the vehicular communication device when the vehicular communication device does not receive the authentication key possession confirmation information when the vehicular communication device is equipped to the first vehicle, and
    not to permit any portable terminal device to operate in cooperation with the vehicular communication device when the vehicular communication device does not receive the authentication key possession confirmation information when the vehicular communication device is equipped to the second vehicle.

17. A method for managing identification information of a portable terminal device, comprising:
  registering identification information of the portable terminal device in association with identification information of a first vehicle to be registered;
  granting an authentication key to the portable terminal device having the identification information, which is registered;
  transmitting one of authentication key possession information and the authentication key from the portable terminal device to a server when the portable terminal device is communicably connected to one of a first vehicular communication device equipped to the first vehicle and a second vehicular communication device equipped to a second vehicle other than the first vehicle;
  transmitting an authentication key possession confirmation information from the server to the one of the first vehicular communication device and the second vehicular communication device when determining that the portable terminal device is authenticated based on the one of authentication key possession information and the authentication key transmitted from the portable terminal device;
  permitting the portable terminal device to operate in cooperation with the one of the first vehicular communication device and the second vehicular communication device which receives the authentication key possession confirmation information; and not permitting the portable terminal device to operate in cooperation with any vehicular communication device which does not receive the authentication key possession confirmation information.

18. The method according to claim 17, wherein
the registering includes registering the identification information of the portable terminal device in association with both the identification information of the first vehicle and identification information of an owner of the portable terminal device,
the method further comprising;
causing the portable terminal device
  to communicate with the server in response to an instruction from the one of the first vehicular communication device and the second vehicular communication device, and
  to receive a service, which is specific to the owner of the portable terminal device, from the server.

19. The method according to claim 17, wherein
the registering includes registering the identification information of a plurality of the portable terminal devices in association with the identification information of the first vehicle.

20. The method according to claim 17, wherein
the granting includes granting the authentication key to the portable terminal device in response to a request of grant of the authentication key and the identification information of the portable terminal device transmitted from the portable terminal device when the identification information of the portable terminal device has been registered.

21. The method according to claim 17, further comprising
storing a common coordination application in each of the first and second vehicular communication devices and the portable terminal device; and
permitting a cooperative operation of the common coordination application.

22. A non-transitory computer readable medium comprising instructions executed by a computer, the instructions including the method according to claim 17.

* * * * *